Apr. 3, 1923.

Re. 15,568

H. B. EADS

AUTOMATIC VALVE AND RIM

Original Filed Mar. 8, 1918

INVENTOR
Harry B. Eads

BY
Philip Barque Price Kennedy
ATTORNEYS

Reissued Apr. 3, 1923.

Re. 15,568

UNITED STATES PATENT OFFICE.

HARRY B. EADS, OF PORT ARTHUR, TEXAS, ASSIGNOR TO WORTHINGTON PUMP AND MACHINERY CORPORATION, OF NEW YORK, N. Y., A CORPORATION OF VIRGINIA.

AUTOMATIC VALVE AND RIM.

Original No. 1,300,935, dated April 15, 1919, Serial No. 221,185, filed March 8, 1918. Application for reissue filed May 10, 1922. Serial No. 559,878.

*To all whom it may concern:*

Be it known that I, HARRY B. EADS, a citizen of the United States, residing at Port Arthur, county of Jefferson, and State of Texas, have invented certain new and useful Improvements in Automatic Valves and Rims, fully described and represented in the following specification and the accompanying drawings, forming a part of the same.

This invention has reference generally to improvements in valves and more particularly relates to an automatic valve and rim.

It is the principal aim and object of this invention to provide a device of the above character designed to act in the capacity of a check when used in conjunction with suitable pumping apparatus for controlling the flow of liquids while suitable resilient means also acts in connection with the pumping means for reseating the valve.

As an additional object the invention embraces the provision of a device of the above mentioned character wherein the rim employed is of a novel form and operates with the valve body for protecting the latter during operation so as to increase the longevity thereof.

It is a more specific object of this invention to provide a device of the above mentioned character wherein the valve casing is designed to form a seat for the rim while in addition suitable guiding means is provided with the rim and designed to co-act with the casing in guiding the movement of the valve body and rim.

As a further improvement the present invention includes the provision of improved means for governing the tension of the resilient means.

Among the other aims and objects of this invention may be recited the provision of a device of the character described with a view to compactness, and in which the number of parts are few, the construction simple and the cost of production low and the efficiency high.

Other improvements and novel details in the construction and arrangement of the various parts of the apparatus will be brought out more in detail in the description to follow, which for a clear understanding of the invention should be considered in connection with the accompanying drawings forming a part hereof, and wherein is disclosed for the purpose of illustration a convenient and satisfactory embodiment of the invention. It is to be noted in this connection that minor changes in the construction and arrangement of parts may be made without departing from the principle of operation of the various parts.

The invention is clearly illustrated in the accompanying drawings, in which;—

Similar characters of reference are employed in all of the above described views to indicate corresponding parts, except in Fig. 4.

Figure 1:
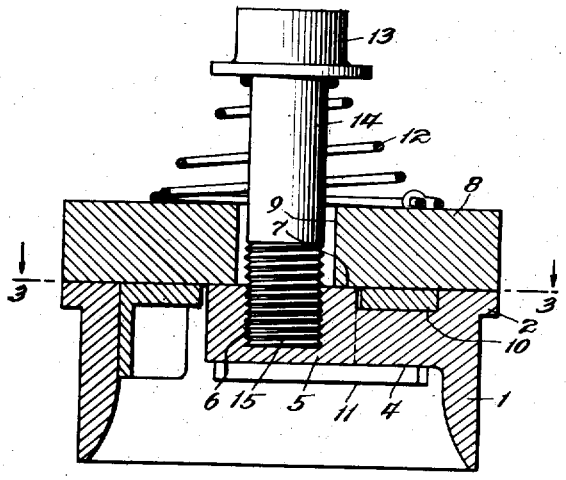
Figure 1 is a vertical section of the invention.

Referring now, more particularly, to the accompanying drawings there is provided a valve embodying a tubular attaching casing 1 formed on the end with an exterior annular flange 2 the outer surface of which together with the adjacent edge of the casing constitute a valve seat 3. Also formed integral with the casing but internally thereof and near the seat is a spider 4 which bridges the casing. A boss 5 is formed at the juncture of the arms and has the upper or outer surface thereof flush with the seat 3 and provided with an interiorly threaded socket 6 for a purpose that will presently appear. Likewise, a secondary or inner seat 7 is provided on the outer surface of the boss.

The valve body 8 is of a disk like form and preferably is constructed of rubber or a substitute therefor, being provided with a central opening 9 and having the outer edge arranged in substantial alinement with the casing when the inner surface of the body abuts the seat 3.

Figure 2:
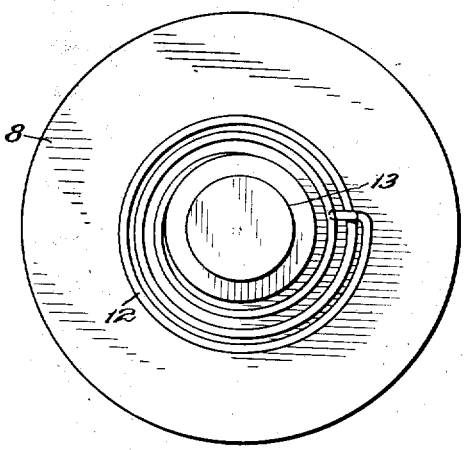
Figure 2 is a top plan view thereof.
Figure 3:
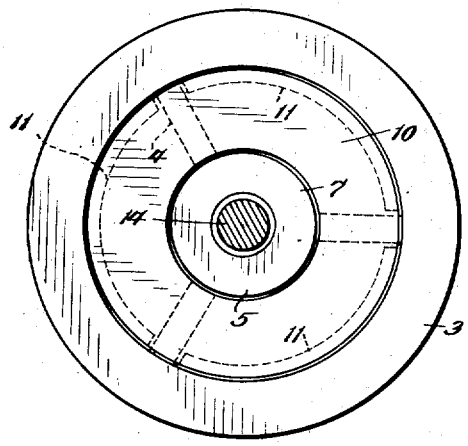
Figure 3 is a horizontal section taken on line 3—3 of Fig. 1.

In order to protect the valve body from the excessive pressure of water when the valve is in use, a rim 10 is employed being of an annular form and constructed desirably of metal and of such size that it may rest on the upper surface of the spider arms 4 and snugly surround the raised secondary seat 7 formed by the top of the boss 5 beneath the valve body 8 as indicated in Fig. 1. Guides 11 project at right angles from the inner face of the rim near the outer edge thereof and lie against the inner surface of the casing 1 so as to cooperate therewith in guiding the movement of the rim and valve body. The rim 10 and valve body 8 preferably are not secured together, but are free to move independently of each other, as shown in Figs. 1 to 3.

As intimated improved means have been employed for yieldingly holding the valve body and rim seated. In reducing this feature of the invention to practice a helical coil spring 12 is employed and has one end bearing against the outer face of the valve body while the opposite or outer end bears against the head 13 of a bolt 14. The inner end of the bolt is threaded as at 15 and adjustably engaged in the threaded socket 6 so that when the head is adjusted the tension of the spring will be regulated to act correspondingly on the valve body and the rim. Incidentally the bolt 14 is arranged through the opening 9 in the body 8 so as to guide the movement of the body when the valve is in operation.

Figure 4:
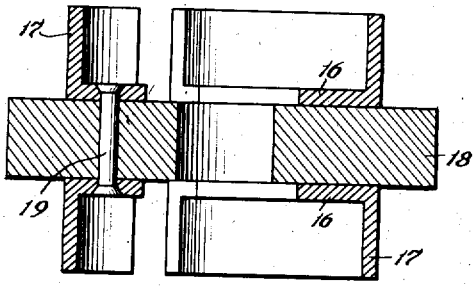
Figure 4 is a detail of another form of the invention.

In Fig. 4 there is disclosed a modified form of the invention which consists in the provision of two rims 16 with guides 17, similar in construction to the rim 10 and guide 11, respectively arranged on the opposite faces of a valve body 18 and connected thereto by rivets 19. By employing the two rims et cetera the valve body may be reversed.

The mode of operation of the invention may be reviewed as follows:

Assuming that the parts have been assembled in the manner described and as indicated in the drawings, particularly Figs. 1 to 3, the action is the same as a check valve. When the pressure is exerted beneath the body 8 the latter will rise together with the rim 10 against the tension of the spring while water will flow through the casing 1. In reseating, the tension of the spring 12 against the valve body after the pressure diminishes reseats the valve body while the water under pressure acts as a cushion for the rim 10 which lessens the chance of breaking the rim in its seating.

It is believed in view of the foregoing description that a further detailed description of the operation of the invention is entirely unnecessary.

As many changes could be made in the above construction and many apparently widely different embodiments of this invention could be made without departing from the scope thereof it is intended that all matter contained in the above description or shown in the accompanying drawings shall be interpreted as illustrative and not in a limited sense. It is also to be understood that the language used in the following claims is intended to cover all the generic and specific features of the invention herein described and all statements of the scope of the invention which as a matter of language might be said to fall therebetween.

Having thus fully described the invention what is claimed and desired to be secured by Letters Patent is:

1. A device of the character described including a casing formed with outer and inner valve seats and a rim seat, a valve body for engagement with said valve seats, a rim for cooperating with the rim seat, and for protecting the valve body, and resilient means for yieldingly and normally holding the valve body and rim on their seats.

2. A device of the character described including a casing formed with outer and inner valve seats, a spider formed in the casing and providing a rim seat, a valve body for engagement with said valve seats, a protecting rim for engagement with the rim seat beneath the valve body, means for guiding the rim, means for guiding the valve body, and resilient means cooperating with the valve body guiding means for yieldingly holding the valve body and rim seated.

3. A device of the character described, including a valve casing formed with outer and inner valve seats, a spider formed in the casing, a boss formed centrally of the spider and having a threaded socket therein, the upper surfaces of said boss and the spider between the boss and the casing forming a secondary valve seat and a rim seat, a disk like body formed of rubber and having an opening therein, a metallic protecting rim for engagement with the rim seat beneath the valve body, guides projecting from the rim, a bolt formed with a head and also threaded and passed through the opening in the valve body and engageable with the socket and designed to guide the valve body during movement, and a spring disposed about the bolt and bearing against the head of the bolt and the valve body for yieldingly holding the body and rim seated.

4. A device of the character described, including a casing formed with a valve seat and a rim seat, a valve body arranged to cooperate with said valve seat, a rim free to move independently of said valve body in seating and arranged to cooperate with said rim seat, said valve seating on said rim and valve seat when closed and acting to seal the passage through the valve seat, and means for yieldingly holding said valve body and rim on their seats.

5. A device of the character described, including a casing formed with a valve seat, a spider formed in the casing and providing a rim seat below the valve seat, a rubber valve body for engagement with the valve seat, an annular rim positioned between said rubber valve body and said spider and free to move independently of said rubber valve body in seating, said valve seating on said rim and valve seat when closed and acting to seal the passage through the valve seat, guides formed on said annular rim and arranged to cooperate with the valve casing, and resilient means arranged to normally hold said rubber valve body and rim on their seats.

6. A device of the character described, including a casing formed with outer and inner valve seats and a rim seat, a valve body arranged to cooperate with said valve seats, a rim free to move independently of said valve body in seating and arranged to co-operate with said rim seat, and means for yieldingly holding said valve body and rim on their seats.

7. A device of the character described, including a casing formed with outer and inner valve seats, a spider formed in the casing and providing a rim seat below the valve seats, a rubber valve body for engagement with the valve seats, an annular rim positioned between said rubber valve body and said spider and free to move independently of said rubber valve body in seating, guides formed on said annular rim and arranged to co-operate with the valve casing, and resilient means arranged to normally hold said rubber valve body and rim on their seats.

In witness whereof I hereunto affix my signature.

HARRY B. EADS.

Witnesses:
HARRY F. BANKER,
ROBT. L. RUTAVO.